ACID TREATING OF HYDROCARBONS
Moses Gordon, Chicago, Ill., Eugene P. Goodmann, Highland, Ind., and George E. Thompson, Chicago, Ill., assignors to Standard Oil Company, Chicago, Ill., a corporation of Indiana
Filed Oct. 17, 1961, Ser. No. 145,579
8 Claims. (Cl. 208—267)

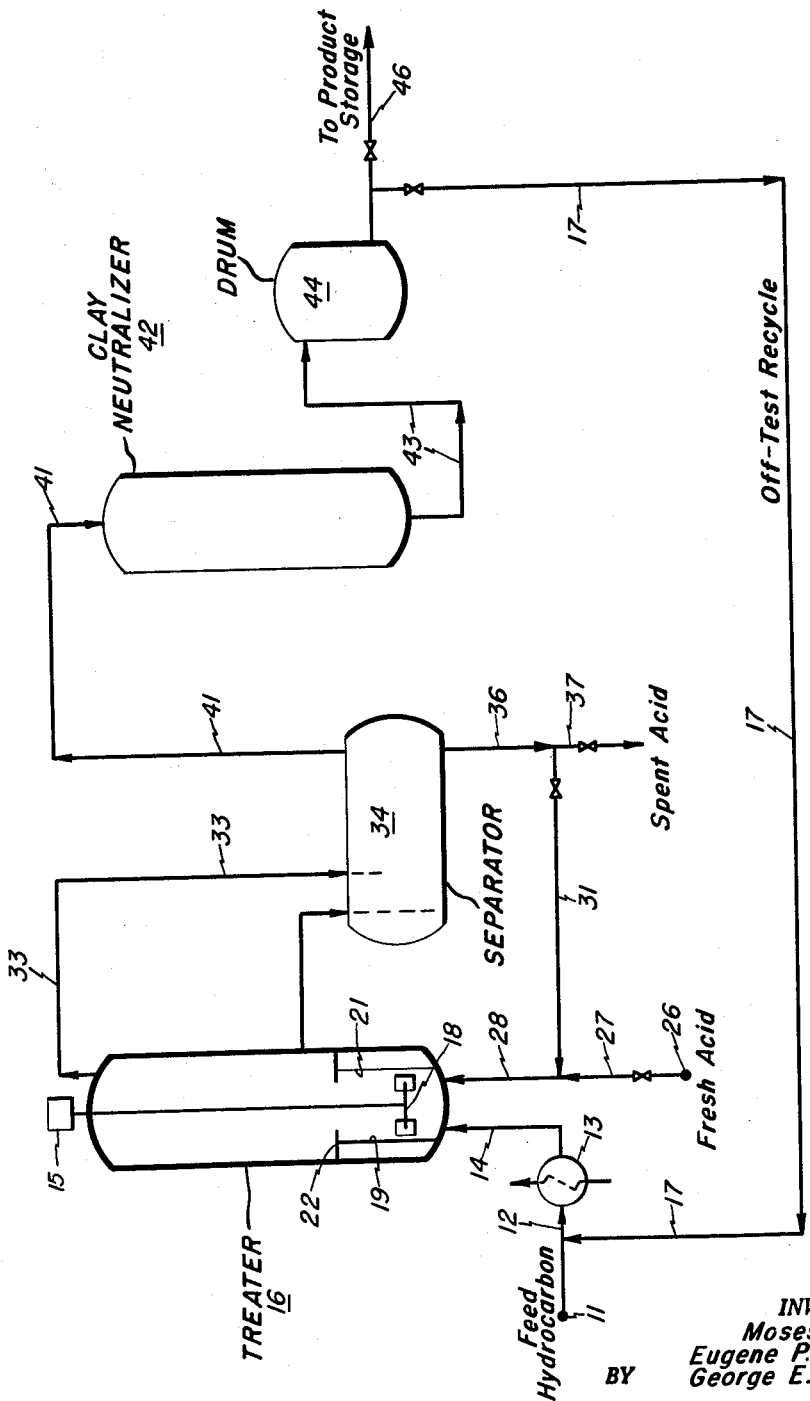

This invention relates to the contacting of liquid hydrocarbons and liquid acid medium to produce liquid hydrocarbons essentially free of acid medium and sludge byproduct.

The petroleum industry and the chemical industry utilize large and small scale operations requiring the contacting of liquid hydrocarbons with a liquid acid medium, such as, sulfuric acid. Such contacting results in liquid hydrocarbon containing droplets of acid medium (and sludge particles) dispersed therein. In subsequent caustic treatment to neutralize the treated oil, the presence of dispersed acid medium increases the amount of caustic needed and, frequently, causes stable emulsions to be formed, and the breaking of which emulsions requires special procedures—both costly and time consuming.

Thus far all efforts to develop a process for contacting a liquid hydrocarbon with an acid medium to produce a haze-free (containing no acid medium or pepper sludge dispersed therein) treated oil have been fruitless. An object of the invention is a method of contacting an acid medium and a liquid hydrocarbon to produce an essentially haze-free treated liquid hydrocarbon, said method not requiring a separate dehazing operation. Another object is a continuous method for contacting a liquid hydrocarbon and an acid medium in a single step to produce a haze-free treated liquid hydrocarbon product. A particular object is a process for sulfuric acid treating of distillate hydrocarbons wherein the treated oil is produced free of sludge and acid particles. Other objects will be apparent from the detailed description of the invention.

The method of the invention utilizes a dispersed liquid system characterized by (a) a liquid acid medium as the continuous phase, (b) liquid hydrocarbon droplets forming the dispersed phase and at least a substantial part of the total dispersed system, (c) a grease-like appearance, and from which system is readily separable clear essentially acid-medium-free treated liquid hydrocarbon. This dispersed liquid system is obtained by contacting the liquid hydrocarbon with the acid medium in various ways which will be described in particular hereinafter. A clear essentially acid-medium-free liquid hydrocarbon, i.e., haze-free treated liquid hydrocarbon, is readily separated from the dispersed liquid system.

The method may be batch wherein the liquid hydrocarbon and acid medium are contacted to form the dispersed liquid system and the dispersed liquid system is then permitted to separate into acid medium layer and haze-free treated hydrocarbon product layer. Or the process may be made continuous by forming the system in one vessel (zone) and separating it into two layers in another vessel (zone). Or the process may be a continuous one wherein the dispersed liquid system is maintained and a supernatant layer of haze-free treated hydrocarbon formed above the dispersed system; said liquid hydrocarbon feed is then added continuously into a lower portion of the dispersed system and clear haze-free treated liquid hydrocarbon is continuously withdrawn from the supernatant layer. In some cases, a third layer is formed providing a three layer system; in this system fresh acid medium and hydrocarbon feed are continuously added to the intermediate dispersed system while treated hydrocarbon product is continuously withdrawn from the supernatant layer and "spent" acid medium is continuously withdrawn from the bottom layer—said three layers being present in the same vessel.

The outstanding characteristic of the dispersed liquid system, as it is seen by the human eye, is the shiny surface and smooth undulating ripples—resembling a grease being agitated by a propeller mixer. The surface sheen and the undulating-flow appearance of the surface of the dispersed liquid system has caused this system to be generally described as "appearing grease-like." The appearance of the surface of the dispersed liquid system does not markedly change with change in the degree of agitation being applied to the system—except when a very large change in agitation takes place and the dispersed liquid system may indeed be destroyed. The dispersed liquid system is a conductor of electricity which shows that it is an oil-in-acid dispersion.

The dispersed liquid system can be formed by contacting a small amount of liquid hydrocarbon with an acid medium or a small amount of acid medium with liquid hydrocarbon. At very low hydrocarbon content it is difficult to maintain the desired characteristics of the dispersed liquid system; the optimum proportion of hydrocarbon and acid medium for a particular use is determined by the type of hydrocarbon, the type of acid medium and the temperature of contacting. For distillate petroleum hydrocarbons a more stable dispersed liquid system is obtained with a system wherein the hydrocarbon dispersed phase is the predominant part of the dispersed system—hydrocarbon contents between 50 and about 80 volume percent give excellent results.

The outstanding result obtainable with the dispersed liquid system of contacting is the clarity of the treated liquid hydrocarbon product. In spite of the self-evident intimate contacting between the liquid hydrocarbon and the acid medium in the dispersed liquid system, the liquid hydrocarbon product contains essentially no dispersed acid medium or sludge particles and may be described as essentially haze-free. Or in another term the liquid hydrocarbon product has a bright appearance.

The liquid hydrocarbon feed to the instant method may be any hydrocarbon which is liquid at ordinary temperatures and pressures or readily liquifiable by operation at somewhat elevated pressures. The liquid hydrocarbon may be a single compound or mixture of close boiling compounds or may be a mixture boiling over a narrow or broad range. To illustrate, materials, such as individually or as mixtures: butanes, hexanes, octanes; benzene, toluene, xylenes, etc. may be charged. Examples of distillate petroleum fractions suitable for use in the method are: light naphtha, boiling over the range of about 80–225° F.; heavy naphtha, boiling over the range of about 200–415° F.; kerosene, boiling over the range of about 325–525° F.; gas oil, boiling over the range of 450–700° F.; etc. The method is applicable to liquid hydrocarbons whether they be aliphatic or aromatic in nature; whether they be saturated or unsaturated; whether they be "straight" chain or cyclic. It is to be understood that the "treated" hydrocarbon may be merely freed of impurities such as sulfur compounds or hydrocarbons soluble in the acid medium, or it may be a new reaction product such as, nitrobenzene or sulfonated hydrocarbon, alone, or in admixture with unreacted hydrocarbon.

The liquid acid medium utilized in the formation of the dispersed liquid system may be any acid which is insoluble in the hydrocarbon or aqueous solutions thereof. Illustrative acids are sulfuric acid; fuming sulfuric acid; aqueous sulfuric acid (such as 60–98); phosphoric acid; hydrochloric acid solutions; acetic acid; nitric acid; chlorosulfonic acid; fluosulfonic acid, etc. The process is especially adapted for sulfuric acid treating because of the formation of sludges, which normally are extremely difficult to remove completely from the treated oil.

The method of the invention may be used at any temperature wherein the acid medium and the hydrocarbon are liquid. It is to be understood that super-atmospheric pressure may be used. Broadly, the temperature of contacting may be between about 30° and 200° F. A more common range of temperatures is the region of about 50° F. to 120° F. It is preferred to operate at the lowest temperatures consistent with the formation and maintenance of a stable dispersed liquid system.

The dispersed liquid system contacting zone of the invention can be formed by many intermingling procedures. Some procedures permit the formation of the dispersed liquid system much more easily than do others. It is entirely possible to form a dispersed liquid system by introducing into a centrifugal pump at proper conditions the liquid hydrocarbon and acid medium; the two liquids emerge from the pump in the form of a dispersed liquid system, which is then passed to a settling vessel wherein the bright hydrocarbon is separated from the acid medium. In another procedure the dispersed liquid system is formed by the use of a propeller mixer or turbine mixer in a vessel wherein the liquid hydrocarbon and the acid medium may be introduced continuously and the dispersed liquid system withdrawn continuously to a separate vessel, then separated from the acid medium and the bright liquid hydrocarbon product. The dispersed liquid system may be formed by the use of any impeller such as a propeller mixer or turbine mixer. When utilizing an impeller it is customary to have the impeller shaft on the vertical axis of the vessel containing the dispersed liquid system; the impeller may be in this instance of the top-entry or bottom-entry type. The dispersed liquid system may be prepared by the use of side-entry impellers when the configuration of the vessel makes this the preferred manner of introducing the agitation means.

When using an impeller position on the vertical axis of the vessel, it is preferred to improve the degree of agitation by installing vertical mixing baffles at the periphery of the vessel. These vertical baffles need project into the interior of the vessel only a relatively short distance in order to provide the additional turbulence needed to form and improve maintenance of the dispersed liquid system. It is to be understood that the particular type of agitating means and the presence of or absence of baffles is a matter which may be determined by ordinary skill for a particular installation, after one has had the benefit of this disclosure and in particular, the illustrative examples, which form a part of this specification and disclosure.

A preferred mode of use of the method of the invention involves the use of a single vessel which functions not only as the contacting zone but also as the separation zone—by this it is to be understood that there are present in the vessel a dispersed liquid system layer (zone) and at least a supernatant bright liquid hydrocarbon product layer. Because this single vessel provides not only the desired contacting between the liquid hydrocarbon feed and the acid medium, but also produces a clear bright liquid hydrocarbon product, the term "Reactor-Clarifier" has been applied to the vessel affording this unitary contacting-clarification result.

When operating a unitary Reactor-Clarifier it is preferred to utilize an impeller selected from the class consisting of propeller mixers and turbine mixers, and more particularly, a top-entry mixer, which mixer is positioned on the vertical axis of the Reactor-Clarifier. The dispersed liquid system zone may be formed either by adding the acid medium and a sufficient amount of liquid hydrocarbon feed separately to the Reactor-Clarifier, or introducing the two amounts substantially simultaneously while the impeller is in motion. Assuming the acid medium and the desired amount of liquid hydrocarbon feed have been introduced into the Reactor-Clarifier individually forming a lower acid medium phase and an upper liquid hydrocarbon feed phase, the blades of the impeller should be positioned in at least a proximate relationship to the acid medium. It is to be understood that the blades of the impeller may be entirely immersed in the acid medium, or substantially immersed therein, or may be entirely immersed in the hydrocarbon phase, a short distance above the top of the acid medium phase. Apparently sufficient intermingling of the two phases is obtained to form the dispersed liquid system when the impeller is entirely within the acid medium phase, but it is very difficult to form the dispersed liquid system when the impeller is in the hydrocarbon phase unless the impeller is capable of drawing substantial amounts of acid medium up into the hydrocarbon phase. The position of a turbine mixer near the interface between the two phases is more critical than that of the propeller. It is preferred to use a propeller which forces the liquid upwards; in this instance forces acid medium upwards into the hydrocarbon phase. When using such an upflow propeller good results are obtainable even when the propeller blades are positioned a substantial distance above the interface of the acid medium and liquid hydrocarbon phases.

The impeller is turned on at a speed which will form the dispersed liquid system; this speed is dependent on the type of impeller, the type of hydrocarbon feed, the type of acid medium and the temperature of contacting. At the proper conditions very quickly the separate phases of acid medium and liquid hydrocarbon disappear and there is present in the Reactor-Clarifier, to the human eye, a viscous creamy liquid. The surface of this liquid presents a smooth undulating appearance like a pool of water into which a small stone has been dropped. In a vessel with transparent sides the dispersed liquid system gives to the eye an impression of violent turbulent motion. A dispersed liquid system, which is on the border line of stability may be, to the eye, a mixture of oily droplets and acid medium. A stable system does not, to the naked eye, show the presence of dispersed droplets.

The most important identifying characteristic of the dispersed liquid system utilized in this invention is the appearance of hydrocarbon product emerging from the dispersed liquid system. It has been found, to the eye, that the "single phase system" can produce a supernatant layer of liquid hydrocarbon which supernatant liquid hydrocarbon is essentially free of droplets of acid medium and is transparent—insofar as the natural color of the hydrocarbon permits. In practice, the emergence of the supernatant hydrocarbon layer is determined by decreasing the degree of agtiation given the dispersed liquid system for its initial formation. After the reduction in degree of agitation a finite period of time elapses before a significant amount of hydrocarbon emerges from the dispersed liquid system. The reason for this initial time lapse is not understood, but may be due to the initial time needed to coalesce a number of dispersed droplets to exceed the capacity of the dispersed liquid system for holding same or it may be due to the mere passage of time needed to accumulate enough supernatant hydrocarbon to become perceptible to the naked eye. In any event after the emergence of a visible supernatant layer, the supernatant layer rapidly increases in depth and finally attains a fixed depth dependent somewhat upon the degree of agitation being imparted to the dispersed liquid system. The rate of emergence of bright hydrocarbon product appears to be most closely related to the composition of the dispersed liquid system, i.e., the relative amounts of oil and acid medium present. The liquid hydrocarbon product is withdrawn from the supernatant layer positioned above the dispersed liquid system layer in the Reactor-Clarifier.

It has been observed in continuous operation wherein two or three layers exist in a Reactor-Clarifier the volume occupied by the dispersed liquid system layer increases with the time of contacting. This increase in volume has been designated "bed expansion" and apparently eventually takes place, regardless of the acid medium and with all types of hydrocarbon feed.

EXAMPLES

The Reactor-Clarifier consisted of a cylindrical jar provided with a bottom draw-off. The jar was 6 inches O.D. and 8 inches outside height. Four stainless steel vertical baffles ⅝ inch wide and 7¾ inches tall were positioned ⅛ inch from the wall of the jar and spaced 90° about the inside of the jar. The agitation was provided by a "half-moon" paddle, 2 inches in diameter, affixed to the end of ¼ inch stainless steel shaft driven by a 1/12 h.p. variable speed electric motor. The shaft was 12 inches long. The paddle was positioned in the jar at a point just below the top of the sulfuric acid present in the jar, i.e., below the interface when no agitation was being provided. A 5,000 ml. separatory flask was used as an oil feed vessel; a 500 ml. flask was used to withdraw product oil by siphoning.

The feed oil was a virgin heater oil distillate and had an ASTM distillation range from 335° F. to 560° F. with a 50% point of 435° F. The mercaptan content—mercaptan number—was 43.6. The initial color was +18 Saybolt; the "aged" color was +11 Saybolt.

Example I

The dispersed liquid system was first formed between the heater oil and 98% sulfuric acid. After 10 minutes the agitation was stopped. In about 30 seconds, the system began to separate into two layers and the separation became complete in a matter of a few minutes. The top layer of treated oil was very clear and bright.

The dispersed liquid system was then reformed at a low impeller speed, leaving a clear supernatant layer of treated oil above the lower system bed. The sour heater oil was then continuously introduced. However, within a few minutes the clear supernatant layer began to show a white cloudy appearance.

Example II

In a second run the system bed was produced between the sour heater oil and 98% sulfuric acid throughout the entire mixture. Following a treating period of 10 minutes, oil and acid were introduced continuously in the ratio of 5 parts oil to 1 part acid. Simultaneously dispersed liquid system was withdrawn, at the same rate, from the mixing vessel into a flask where separation between the hydrocarbon and acid phase occurred. The oil product was extremely clear and bright.

In Example II, the temperature of treating was about 75° F. The sour oil was charged at a rate of 65 ml. per minute; the total oil charge was 4800 ml. The overall charge of the 98% sulfuric acid gave a ratio of volumes of oil treated per volume of acid charged of 3:1.

The treated oil had a mercaptan number of 1.9, which included some $SO_2$ neutralization. The initial color of the treated oil was +28 and the "aged" color was +27.

The "aged" color is measured after 100 ml. of the oil has been heated for 20 hours, in an open tube, at 200° F. This test is used to measure the ability of the oil to resist deterioration in vented tank storage.

It was observed that if the treated oil product was placed in an unstoppered bottle, the oil began to show a white turbid appearance. It was postulated that the treated oil had considerable $SO_2$ dissolved in it, and since $SO_2$ has a great affinity for moisture, it absorbed moisture from the air and formed small droplets of $H_2SO_3$. This postulate was proved by collecting two bottles of the system and letting them separate. One bottle was stoppered while the other remained unstoppered. The system in the stoppered bottle separated with a treated oil layer that was very clear and bright and this remained so. However, in the unstoppered bottle the bright clear treated oil soon began to show the white, cloudy turbid appearance and within a half hour was completely cloudy. The hazy oil was filtered through a bed of glass wool and the filtrate came out very clear and bright.

Example III

In this test, a comparison oil was produced on the equipment used in Examples I and II. The sour oil feed and acid used in those examples was used here, but the agitation was controlled to give an ordinary acid-oil mixture rather than the dispersed liquid system. The separated oil was full of pepper sludge and had to be caustic neutralized and filtered through glass wool to obtain a clear oil. The overall volume ratio of oil charged to 98% acid charged was 2.5:1. The product oil was doctor sweet; had an initial color of +26, Saybolt; and had an aged color of +20. Thus, even though, it received a somewhat heavier acid treat, the conventionally treated oil was not as good quality as the oil produced by the method of the invention.

THE FIGURE

The figure annexed hereto forms a part of this specification and shows one illustrative embodiment of the invention. Herein there is produced highest quality alkymer for use in the production of detergents. The raw alkymer is produced by the reaction of benzene and propylene tetramer. The alkylmer as produced does not pass the acid wash test. In order to meet this test the alkymer must be sulfuric acid treated.

In this embodiment the feed hydrocarbon, i.e., detergent alkymer, from source 11 is passed by way of line 12 through heat exchanger 13 and line 14 into treater 16. When the treated alkymer is off-test it can be recycled by way of valved line 17 and combined with the fresh alkymer in line 12.

In this embodiment a total of 34 barrels (42 U.S. gals.) per hour—b./h.—are charged into treater 16. The temperature of the feed is adjusted so that the material from line 14 is at about 100° F. (It is to be understood that items of equipment such as pumps are not shown because these may be readily added by those of ordinary skill.)

Treater 16 is adapted to produce a dispersed liquid system of sulfuric acid and feed hydrocarbon. Treater 16 is a cylindrical vessel of 5' internal diameter (I.D.) The vertical height of the straight side is 10'. A motor driven 15 turbine impeller 18 provides the necessary agitation. The turbine has an O.D. of 2'6" and is provided with blades 9" sq. At the bottom of treater 16 there are positioned 4 vertical baffles—90° apart—which are 2' high and extend 6" from the vertical wall of the treater 16. Two of these baffles 19 and 21 are shown. At the top of the vertical baffles there is positioned an annular ring 22 which extends 1' from the vertical wall of treater 16. The vertical baffles 19 et seq. and doughnut 22 assist in the dispersion.

Fresh 98% sulfuric acid from source 26 is passed by way of valved line 27 and line 28 into the bottom of treater 16. Recycle acid may be returned by way of valved line 31 and line 28 to treater 16. In this embodiment 1.7 b./h. of acid are charged to treater 16.

Turbine 18 at 100 r.p.m. forms a dispersed liquid system within treater 16. The dispersed liquid system is withdrawn by 2 outlets; about 29 b./h. of dispersed liquid system is withdrawn from the top of treater 16 and passed by way of line 33 into separator 34; about 6.7 b./h. are withdrawn at a point 6" above doughnut 22 and passed by way of line 36 into the bottom of separator 34.

Separator 34 is a vessel adapted for separation of 2 liquids into an upper and a lower phase. The dispersed liquid system rapidly separates into an upper treated alkymer phase and a lower acid phase. The lower acid phase is withdrawn from separator 34 by way of line 36. The spent acid may be discarded by way of valved line 37 or recycled by way of valved line 31 and line 28 to treater 16. In general the amount of recycled acid is restricted in order to produce highest quality product.

The upper treated alkymer phase in separator 34 is clear and bright, i.e., it is essentially free of dispersed pepper sludge but contains some dissolved sulfur dioxide and a tiny amount of dissolved acid.

The upper hydrocarbon phase is withdrawn from separator 34 and passed by way of line 41 into the top of clay neutralizer vessel 42. Vessel 42 is filled with fine adsorbent clay such as fuller's earth fines. The clay adsorbs from the treated alkymer the acid material present. Neutralized alkymer is withdrawn from the bottom of vessel 42 and passed by way of line 43 into storage drum 44.

The material in storage drum 44 is treated periodically and, if on-test, is passed to storage by way of valved line 46. Typically the embodiment produces 33 b./h. of a product detergent alkymer.

Thus having described the invention, what is claimed is:

1. A continuous method of contacting a feed liquid hydrocarbon with a liquid acid medium, which method comprises, simultaneously contacting and separating said hydrocarbon and said acid medium in a contacting-separating zone having a supernatant layer of essentially haze-free hydrocarbon above a layer of dispersed liquid system by (a) intermingling said hydrocarbon and said acid medium to form a dispersed liquid system characterized by: acid medium as the continuous phase; liquid hydrocarbon droplets as the dispersed phase, said droplets providing at least a substantial part of said dispersed system; a grease-like appearance; and ready separability into a clear, essentially acid-medium-free treated hydrocarbon phase and an acid phase; (b) controlling the intermingling to provide a supernatant layer of clear, essentially acid-medium-free treated liquid hydrocarbon above a layer of dispersed liquid system, (c) passing feed liquid hydrocarbon into said layer of dispersed liquid system and (d) withdrawing clear, essentially acid-medium-free treated liquid hydrocarbon from said supernatant layer.

2. The method of claim 1 wherein said medium is sulfuric acid.

3. The method of claim 1 wherein said medium is nitric acid.

4. The method of claim 1 wherein the temperature of treating is from about 50° F. to about 120° F.

5. The method of claim 1 wherein said feed is a heater oil.

6. The method of claim 1 wherein said feed is naphtha.

7. The method of claim 1 wherein said feed is benzene.

8. The method of claim 1 wherein said intermingling is characteristic of that produced by propeller mixers and turbine mixers positioned within said medium at the initial intermingling for formation of the dispersed liquid system.

References Cited by the Examiner

UNITED STATES PATENTS 2,035,655    3/36    Jones _____ 208—267

FOREIGN PATENTS 602,787    8/60    Canada.
603,579    8/60    Canada.

OTHER REFERENCES

Kalichevsky et al.: Petroleum Refining With Chemicals; Elsevier Publishing Co., New York (1956), page 117 relied upon.

ALPHONSO D. SULLIVAN, *Primary Examiner.*